United States Patent [19]

Nadan

[11] Patent Number: 4,633,294
[45] Date of Patent: Dec. 30, 1986

[54] METHOD FOR REDUCING THE SCAN LINE VISIBILITY FOR PROJECTION TELEVISION BY USING A DIFFERENT INTERPOLATION AND VERTICAL DISPLACEMENT FOR EACH COLOR SIGNAL

[75] Inventor: Joseph S. Nadan, New York, N.Y.

[73] Assignee: North American Philips Corporation, New York, N.Y.

[21] Appl. No.: 678,609

[22] Filed: Dec. 7, 1984

[51] Int. Cl.$^4$ .............................................. H04N 9/31
[52] U.S. Cl. ........................................ 358/11; 358/60
[58] Field of Search ........................ 358/11, 12, 56, 60, 358/61, 62, 63, 64

[56] References Cited

U.S. PATENT DOCUMENTS

| 4,400,719 | 8/1983 | Powers | 358/11 |
| 4,456,923 | 6/1984 | Annegarn et al. | 358/64 |
| 4,482,919 | 11/1984 | Alston et al. | 358/242 |
| 4,524,379 | 6/1985 | Okada et al. | 358/11 |

FOREIGN PATENT DOCUMENTS

59-181886 10/1984 Japan .

Primary Examiner—John W. Shepperd
Attorney, Agent, or Firm—Thomas A. Briody; Jack Oisher; William J. Streeter

[57] ABSTRACT

A method for reducing the scanning line visiblity in the display of a color projection television receiver in which the rasters of scanning lines for the separate color signals are deconverged by vertically shifting the scanning line raster of each color signal with respect to the other color signal. Each projected line of the respective color signals is then derived by a weighted interpolation between two succeeding lines in the incoming television signal, in which the contribution of a first incoming line with respect to a second incoming line is dependent on the amount by which the respective line in the raster of the relevant color signal is vertically shifted. The amounts of vertical shifting of the respective rasters is cyclically rotated between the respective rasters once every picture frame.

8 Claims, 10 Drawing Figures

| FIELD | 1a | 1b | 2a | 2b | 3a | 3b |
|---|---|---|---|---|---|---|
| | T | | T | | T | |
| | R | | | B | | G |
| | G | T | R | T | B | T |
| | | G | | R | | B |
| | B | | G | | R | |
| | T | B | T | | T | R |
| | R | | B | | G | |
| | | R | | B | | G |
| | G | T | R | T | B | T |
| | | G | | R | | B |
| | B | | G | | R | |
| | T | B | T | | G | T R |

FIG.2C

| FIELD | 1a | 1b | 2a | 2b | 3a | 3b |
|---|---|---|---|---|---|---|
| | T | | T | | T | |
| | R | | G | | B | |
| | G | T R | B | T G | R | T B |
| | B | G | R | B | G | R |
| | T | | T | | T | |
| | R | B | G | R | B | G |
| | G | T R | B | T G | R | T B |
| | B | G | R | B | G | R |
| | T | | T | | T | |

METHOD FOR REDUCING THE SCAN LINE VISIBILITY FOR PROJECTION TELEVISION BY USING A DIFFERENT INTERPOLATION AND VERTICAL DISPLACEMENT FOR EACH COLOR SIGNAL

BACKGROUND OF THE INVENTION

The subject invention relates to a method for reducing the scan line visibility in the display of a projection television receiver, which receiver includes three projection devices for projecting the three color signals red, green and blue, each projection device generating a raster of scanning lines, said rasters being converged with each other in superposition at a display screen for forming a desired display image.

Movie theaters have always had an advantage over television in that the theaters are able to present a life-size, or larger than life-size, image to the viewing public while television has been limited to small screen sizes, for example 19, 21 and 25 inches. However, with the advent of projection television, displays of 6–10 feet are now available to the consumer enabling one to have the benefit of a large screen display in one's own home.

While the images present on a standard television receiver are adequate, i.e. at a reasonable viewing distance, the scanning lines are for the most part indistinguishable, when these same images are then projected onto a large display screen in which the displayed image is, for example, ten times larger than that on a standard television receiver, the scanning lines become much more visible. This is in part due to the fact that the viewing distance is not increased to the same extent that the image is expanded.

Techniques have been suggested for reducing the scan line visibility in the projected image. These techniques include increasing the number of scan lines by various means of interpolation. However, in these techniques the projection television receiver must then output the lines at twice the normal sweep rate. This would require digital conversion of the signal, wider bandwidth video amplifiers and wider bandwidth deflection circuits, along with the inclusion of A/D and D/A converters and digital memory for at least three lines. Hence, the projection television receiver, which already is expensive, would become much more expensive.

SUMMARY OF THE INVENTION

The object of this invention is to reduce the scan line visibility in the displayed image of a projection television receiver without significantly affecting the cost thereof.

This object is achieved in a method for reducing the scan line visibility in the display for a projection television receiver as set forth in the opening paragraph, characterized in that the method comprises the steps storing, for each color signal, at least one television scanning line of a video signal to be displayed, deriving an output television scanning line from the stored television line and a succeeding television line using a separate relationship for each color signal, repeating the storing and deriving steps for forming each output line to be projected, and vertically displacing the displayed raster lines for each of the projection devices such that the raster lines from the projection devices are not in superposition.

In projection television receivers having three projection devices for the three color signals, as in a monochrome television receiver, there is no need for a shadow mask as is present in a color television receiver. In fact, each of the individual projection devices is a type of monochrome display. In present projection television receivers, it is customary to converge the projected images from the separate projection devices such that the individual scan lines therein are superposed. This results in a displayed composite image having the same number of scan lines as the individual images from the respective projection devices. It has been recognized that without a shadow mask, these three projected images may be deconverged such that the scan lines therein do not superpose one another. Hence, the resultant combined displayed image effectively has three times the number of scanning lines.

In addition to the above, since now the individual rasters for the color signals are vertically shifted from the original positions thereof, each of the shifted lines are now formed by a weighted interpolation between two succeeding incoming video lines. This weighting is dependent upon the actual amount by which the respective color rasters are shifted.

DESCRIPTION OF THE DRAWINGS

With the above and additional objects and advantages in mind as will hereinafter appear, the invention will be described with reference to the accompanying drawings in which.

DESCRIPTION OF THE PREFERRED EMBODIMENT

Figure 1:
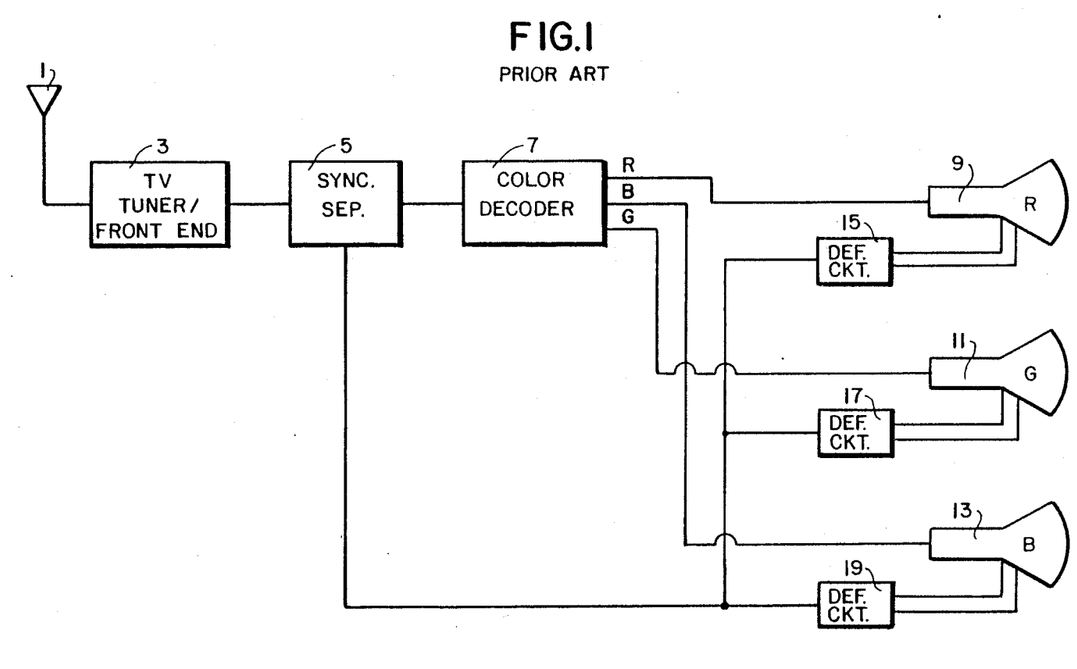
FIG. 1 is a block diagram of a projection television receiver.

FIG. 1 is a block diagram of a standard projection television receiver. Television video signals are received by antenna 1 and the desired signal is tuned and amplified in the tuner/front end 3. Synchronizing signal separator 5 removes the synchronizing signals from the video signal at the output of tuner/front end 3, which video signal is then applied to a color decoder 7 for recovering the separate color signals red (R), green (G), and blue (B). These color signals are then applied to the electron guns of three projection devices 9, 11 and 13, respectively. The synchronizing signals separated from the video signal by the synchronizing signal separator 5, are applied to three separate deflection circuits 15, 17 and 19 which provide the horizontal and vertical deflection signals for the deflection coils of the projection devices 9, 11 and 13, respectively.

In operation, each of the projection devices 9, 11, 13 produces a projected optical raster of scanning lines, the content of which being based on the color signal applied thereto. In accordance with the NTSC standard, this raster includes 525 lines formed in two interlace fields with a field frequency ($f_v$) of 60 Hz. It should be noted that on display, there is a finite distance between each of the lines in each field of the raster.

In prior art projection television receivers, the signals from the respective deflection circuits 15, 17 and 19 are adjusted so that on a remote display screen, the rasters of the projection devices 9, 11, 13 are superposed.

Figure 2A:
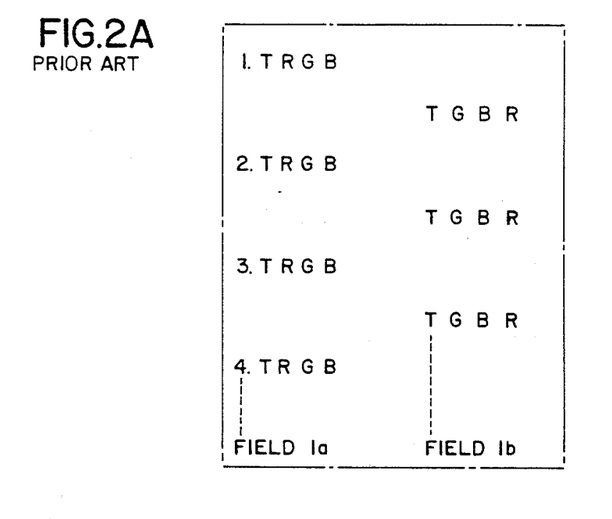
FIG. 2A is a chart showing the display of a standard projection television receiver.

FIG. 2A shows a chart which graphically illustrates the display of a projection television receiver. The lines of an incoming video signal are each shown as "T" while the three superposed projected color lines are shown as "R","G" and "B". The projected color lines R, G, B are derived directly from the incoming video signal and are displayed without any respective vertical shifting. Thus, FIG. 2A shows these projected color lines R, G, B in line with the incoming lines of the video signal.

In order to reduce the scanning line visibility, the method of the subject invention vertically shifts each of the lines of the respective color signals such that they are not superposed and are vertically spaced between the positions of two succeeding lines if the color lines were in superposition and not shifted. This is shown graphically in FIG. 2B. In order to smooth the optical transition from the signals of one line in the composite video signal to the next line, the method includes deriving each of the lines of the color signals R, G, B from two succeeding incoming lines of the video signal by a weighted interpolation in which the contribution of a first incoming line relative to a succeeding line is dependent upon the amount by which the lines of the respective color signals are vertically shifted.

The invention further contemplates cyclically rotating the relative vertical shifting of the lines of the respective color signals, in which the relative vertical shifting for each color signal is changed at the picture frame rate.

Figure 3A:
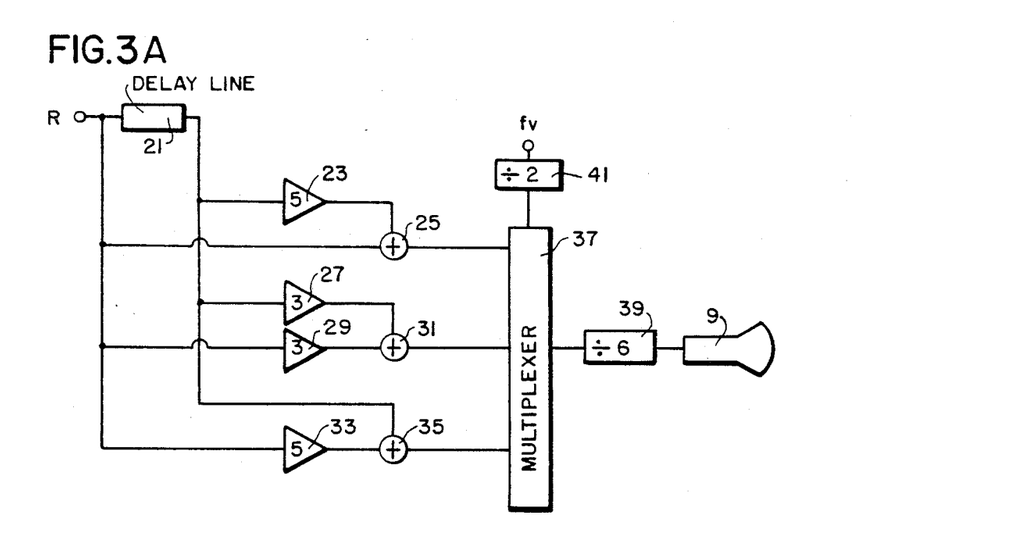
FIG. 3A is a block diagram of a first embodiment of circuitry for performing line interpolations in accordance with the invention.

FIG. 3A shows, in block diagram form, circuitry for effecting the interpolation of the lines of the respective color signals. For the sake of simplicity, circuitry is only shown for one of the color signals (R), it being understood that the circuitry for the other two color signals (G, B) is identical thereto. The color signal R from the color decoder 7 of FIG. 1, is applied to a line delay 21. The output of this line delay 21 is applied to a multiplier 23 which multiplies the delayed color signal by 5. The output of multiplier 23 along with the input to the line delay 21 are then applied to an adder 25. Similarly, the output of line delay 21 is multiplied by 3 in multiplier 27 while the input to line delay 21 is multiplied by 3 in multiplier 29, the outputs of multipliers 27 and 29 being added in adder 31. Finally, the input of line delay 21 is multiplied by 5 in multiplier 33 and the output therefrom along with the output of line delay 21 are added in adder 35. The three sum signals from adders 25, 31 and 35, respectively, are applied to respective inputs of a multiplexer 37, the output therefrom being divided by 6 in divider 39 and applied to projection device 9. Field synchronizing signals $f_v$ are applied, via a divide-by-2 divider 41, to the clocking input of multiplexer 37. Arranged as such, the three resulting relationships for output lines L01, L02 and L03 are as follows:

$$L01 = (5L1 + L2)/6$$

$$L02 = (3L1 + 3L2)/6$$

$$L03 = (L1 + 5L2)/6$$

The relationship which is applicable at a particular point in time, is determined by the multiplexer 37 which is clocked at the picture frame rate.

In standard color projection television receivers, in order to converge the rasters of the respective color signals, DC signals are added to the horizontal and vertical deflection signals for each of the projection devices 9, 11 and 13. The levels of these DC signals are then adjusted until the respective rasters are in superposition. The subject invention uses this same principle to effect the vertical shifting of the lines of the respective color signals.

Figure 4A:
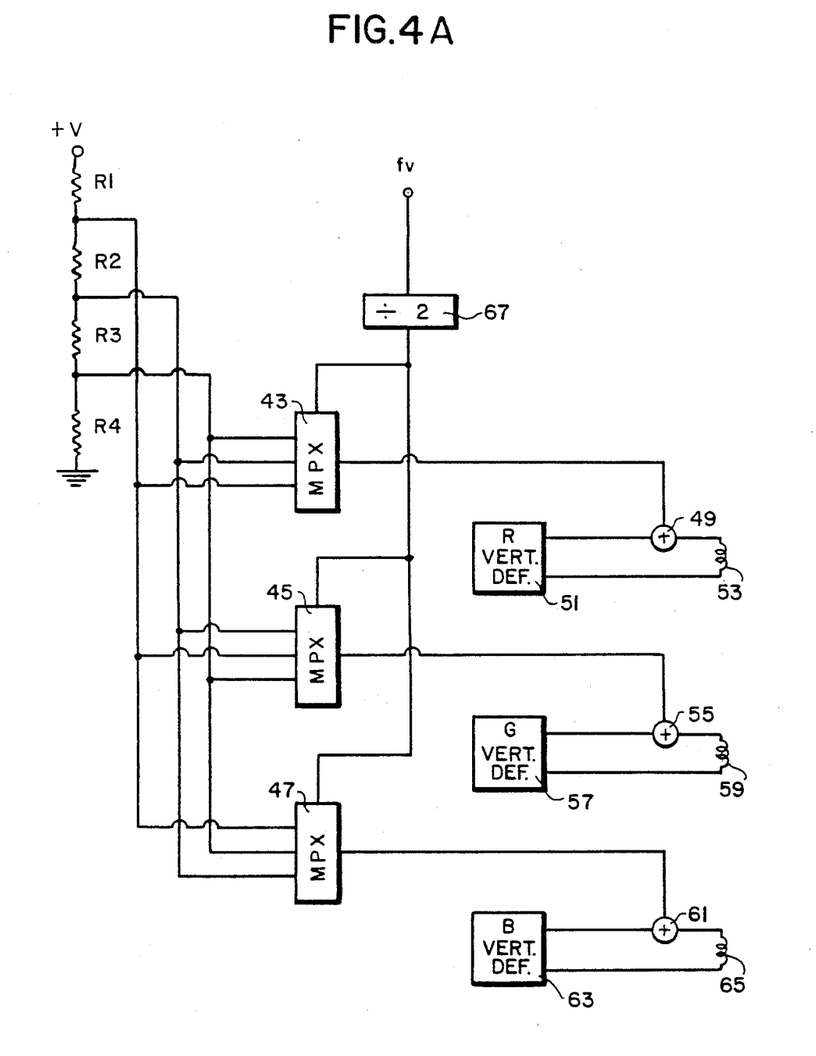
FIG. 4A is a block diagram of a first embodiment of circuitry for shifting the vertical positions of the respective color rasters.

FIG. 4A shows, in block diagram form, circuitry for applying three different DC signals to the vertical deflection coils of the respective projection devices 9, 11 and 13, and for cyclically rotating the application of these DC signals. In particular, a DC voltage is applied to the serial arrangement of resistors R1, R2, R3 and R4. The junction between resistors R1 and R2 is connected, respectively, to the third, second and first inputs of multiplexers 43, 45 and 47, respectively. The junction between resistors R2 and R3 is connected, respectively, to the second, first and third inputs of multiplexers 43, 45 and 47, respectively. Finally, the junction between resistors R3 and R4 is connected, respectively, to the first, third and second inputs of multiplexers 43, 45 and 47. The output of multiplexer 43 is added in adder 49 to the output of the red vertical deflection circuit 51 for application to the vertical deflection coil 53 of the projection device 9. Similarly, the output of multiplexer 45 is applied to adder 55 which adds the same to the output of deflection circuit 57 for application to deflection coil 59 of projection device 11. Finally, the output of multiplexer 47 is applied to adder 61 which adds this output signal to the output of the deflection circuit 63 for application to the deflection coil 65 of projection device 13.

Each of the multiplexers 43, 45 and 47 receive the same clocking signal at the picture frame rate by applying the field synchronizing signal $f_v$, via a divide-by-2 divider 67, to the respective clocking inputs thereof.

Figure 2B:
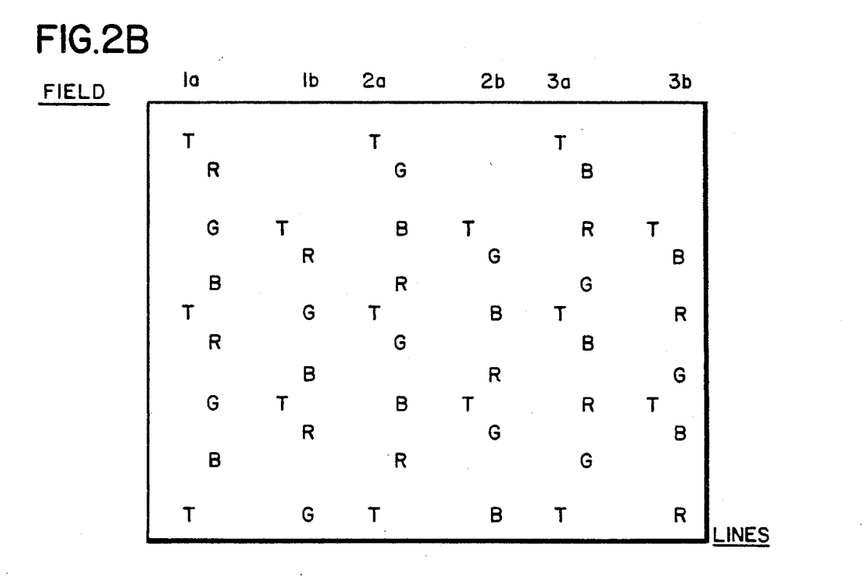
FIG. 2B is a chart showing the display of a projection television receiver incorporating an embodiment of the invention.
Figure 2C:
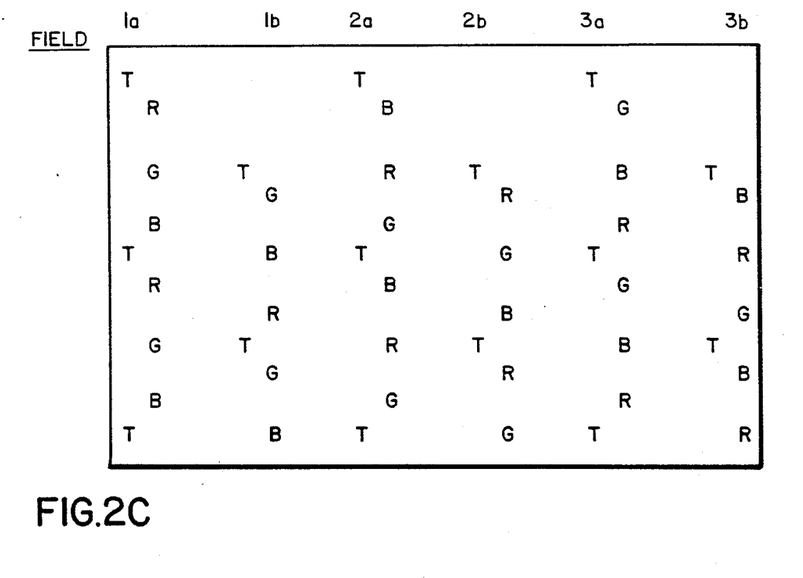
FIG. 2C is a chart as in FIG. 2B in which interpolation and rotation are performed at the field frequency.

An alternate embodiment of the invention is graphically shown in FIG. 2C in which the multiplexer 37 in FIG. 3 and the multiplexers 43, 45 and 47 in FIG. 4A are switched at the field frequency rate $f_v$, thereby obviating the dividers 41 and 67.

Figure 4B:
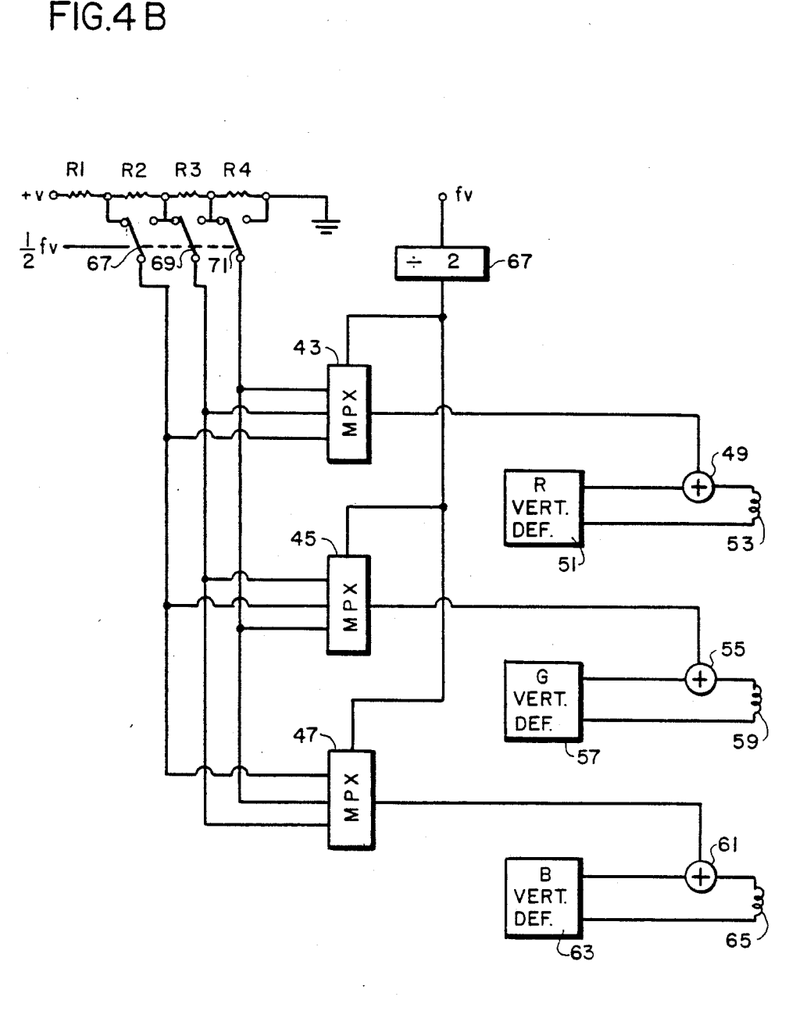
FIG. 4B is a block diagram of a second embodiment of the circuitry of FIG. 4A.

While the embodiments depicted in FIGS. 2B and 2C, effectively produce displays having three times the normal number of vertical scanning lines, it takes at least four field periods to cycle through the three colors at each line position. This gives rise to artifacts in making the color "white". In order to reduce, if not eliminate, these artifacts, a further embodiment of the invention proposes, as shown in FIG. 4B, to vertically shift each of the second fields in each picture frame to a different extent than the first fields such that the individual color line in the second fields overlay the color lines in the first fields. This effectively produces a display have 1.5 times the normal number of vertical scanning lines. To this end, the circuit of FIG. 4B is substantially similar to FIG. 4A with the exception that switches 67, 69 and 71 are inserted between the voltage divided R1–R4 and the multiplexers 43–47. In particular, the junction between resistors R1 and R2 is connected to a first terminal of switch 67; the junction between resistors R2 and R3 is connected to a second terminal of switch 67 and a first terminal of switch 69; the junction between the resistors R3 and R4 is connected to a second terminal of switch 69 and a first terminal of switch 71, while a second terminal of switch 71 is connected to ground. The switches 67, 69 and 71 are controlled, in synchronism, by a signal having the frequency $\frac{1}{2} f_v$. In a first position, as shown, the switches 67, 69 and 71 connect the voltage divider as shown in FIG. 4A for a first field, while in a second field, the switches 67, 69 and 71 are switched to a second position (not shown) which causes the color lines in the second field to overlay the color lines in the first field.

In addition, while the output lines of the color signals in the first fields are interpolated in accordance with the relationships L01, L02, L03, the output lines of the color signals in the second fields are interpolated in accordance with the relationships:

$$L04 = (L1 + L2)/2$$

$$L05 = (2L1 + L2)/3$$

$$L06 = (L1 + 2L2)/3$$

Figure 3B:
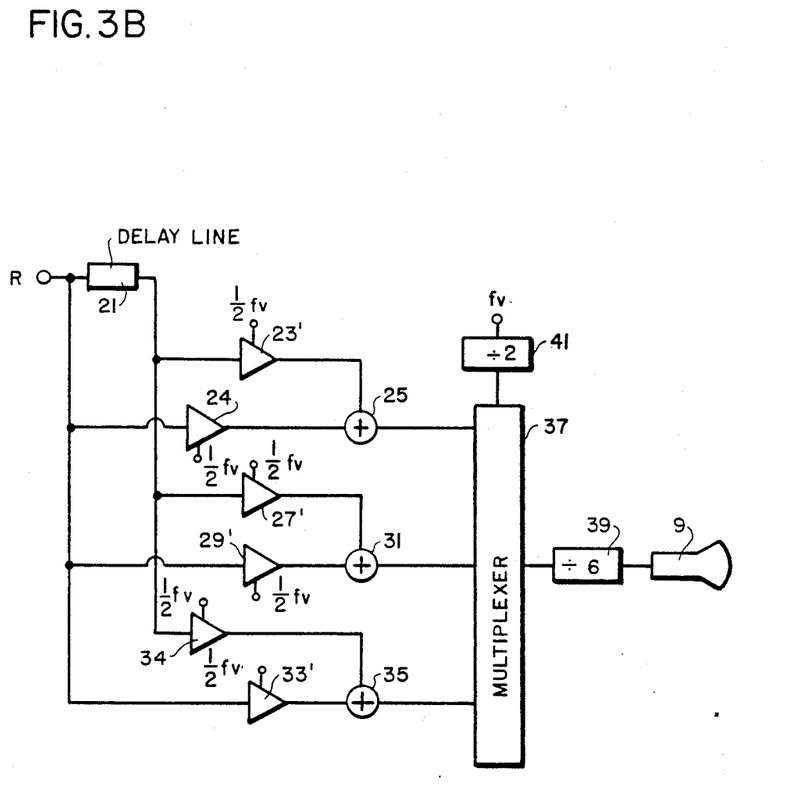
FIG. 3B is a block diagram of a second embodiment of the circuitry of FIG. 3A.

To generate the interpolated output lines L01, L02 and L03 in the first field and the interpolated output lines L04, L05 and L06 in the second field, the circuit of 3A is modified as shown in FIG. 3B by inserting multipliers 24 and 34 in the direct connections to the adders 25 and 35. The multipliers 24, 34 and 23', 27', 29' and 33' are switchable between the factors 1, 1, 5, 3, 3 and 5, respectively, and 3, 4, 3, 2, 4 and 4, respectively, and receive switching signals, in synchronism, at the frequency $\frac{1}{2} f_v$.

Figure 2D:
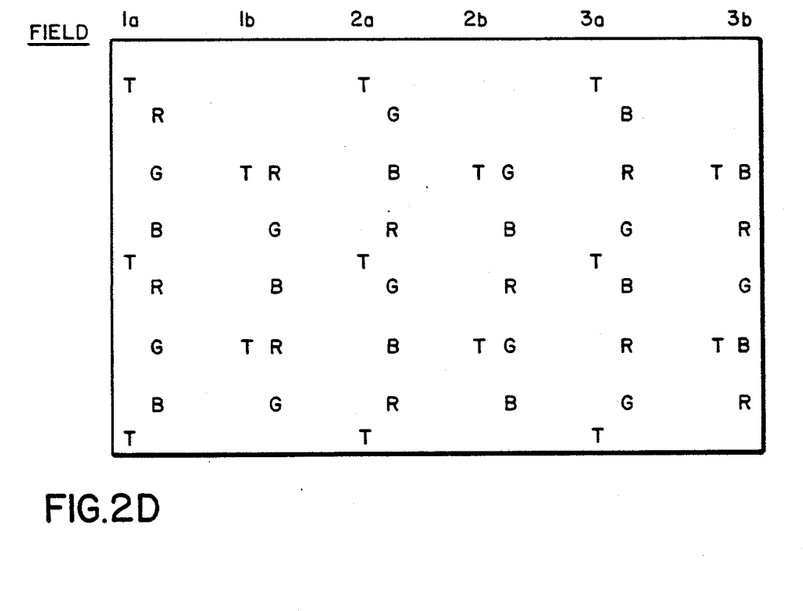
FIG. 2D is a chart showing the display of a projection television receiver incorporating a further embodiment of the invention.

As shown in FIG. 2D, the color signals in each field now overlap one another and, as such, the three color signals R, G, B needed to make "white" appear after only the duration of two field periods.

Figure 2E:
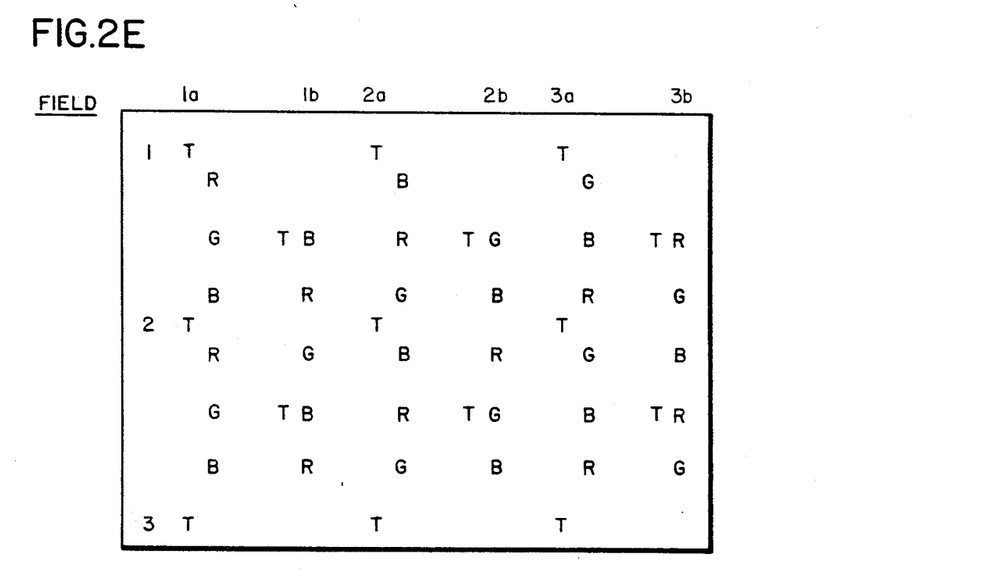
FIG. 2E is a chart as in FIG. 2D in which rotation is performed at the field frequency.

FIG. 2E shows a display as in FIG. 2D in which the dividers 41 and 67 are deleted and the multiplexer switching is effected at the field frequency as opposed to the picture frame frequency.

Numerous alterations of the structure herein disclosed will suggest themselves to those skilled in the art. However, it is to be understood that the present disclosure relates to a preferred embodiment of the invention which is for purposes of illustration only and not to be construed as a limitation of the invention. All such modifications which do not depart from the spirit and scope of the invention are intended to be included within the appended claims.

What is claimed:

1. A method for reducing the scan line visibility in the display for a projection television receiver, which receiver includes three projection devices for projecting the three color signals red, green and blue, each projecting device generating a raster of scanning lines, said rasters being converged with each other in superposition at a display screen for forming a desired display image, said method comprising the steps:
   storing, for each color signal, at least one television scanning line of a video signal to be displayed;
   deriving, for each color signal, an output television scanning line from said stored television line and a succeeding television line using a separate relationship for each color signal;
   repeating said storing and deriving steps for forming each output television line to be projected; and
   vertically displacing the displayed raster lines for each of said projection devices such that the raster lines from said projection devices are not in superposition.

2. The method as claimed in claim 1, wherein said relationships used in said deriving step are $L01 = (5L1 + L2)/6$, $L02 = (L1 + L2)/2$ and $L03 = (L1 + 5L2)/6$, in which L01, L02 and L03 are the derived output television lines, L1 is the stored television line and L2 is the succeeding television line.

3. The method as claimed in claim 2, wherein the amount by which each of the displayed raster lines of said projection devices is vertically shifted is dependent on the relationship used to generate the respective output television line.

4. The method as claimed in claim 1, 2 or 3, wherein the amounts by which the displayed raster lines of said projection devices are vertically shifted and the separate relationships are cyclically rotated.

5. The method as claimed in claim 4, wherein the cycling rate is the same as the picture frame in the video signal.

6. The method as claimed in claim 4, wherein the cycling rate is the same as the field frequency in the video signal.

7. The method as claimed in claim 1, wherein the scanning lines in said video signal for forming each of said rasters are presented in two interlaced fields and that the lines in a first of said fields are vertically displaced to a different extent than the lines in a second of said fields whereby the lines in the second of said fields overlay the line in the first of said two fields.

8. The method as claimed in claim 7, wherein the relationships for said first fields are $L01 = (5L1 + L2)/6$, $L02 = (L1 + L2)/2$ and $L03 = (L1 + 5L2)/6$, while the relationships for said second fields are $L04 = (L1 + L2)/2$, $L05 = (2L1 + L2)/3$ and $L06 = (L1 + 2L2)/3$, in which L01 to L06 are the derived output television lines, L1 is a stored television line and L2 is a succeeding television line.

* * * * *